(No Model.) 2 Sheets—Sheet 1.
P. BLAKER.
HARROW OR CULTIVATOR.
No. 454,324. Patented June 16, 1891.
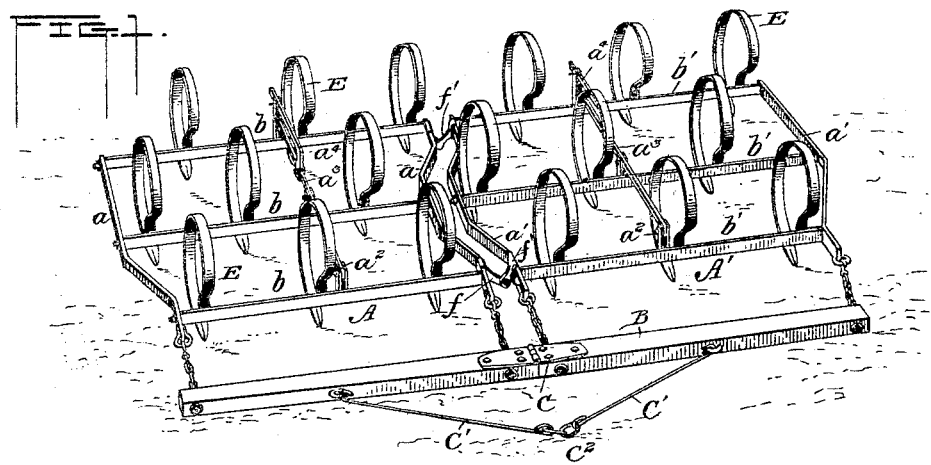
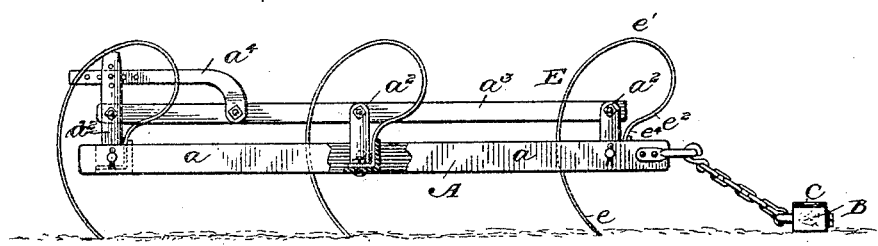
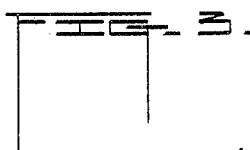
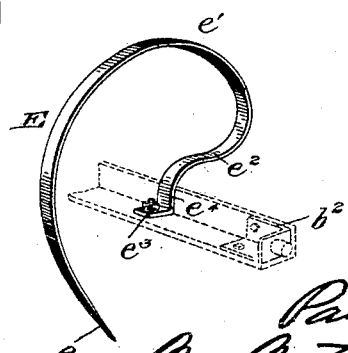
WITNESSES
INVENTOR
Paul Blaker
By Butterworth Hall & Brown
Attorneys

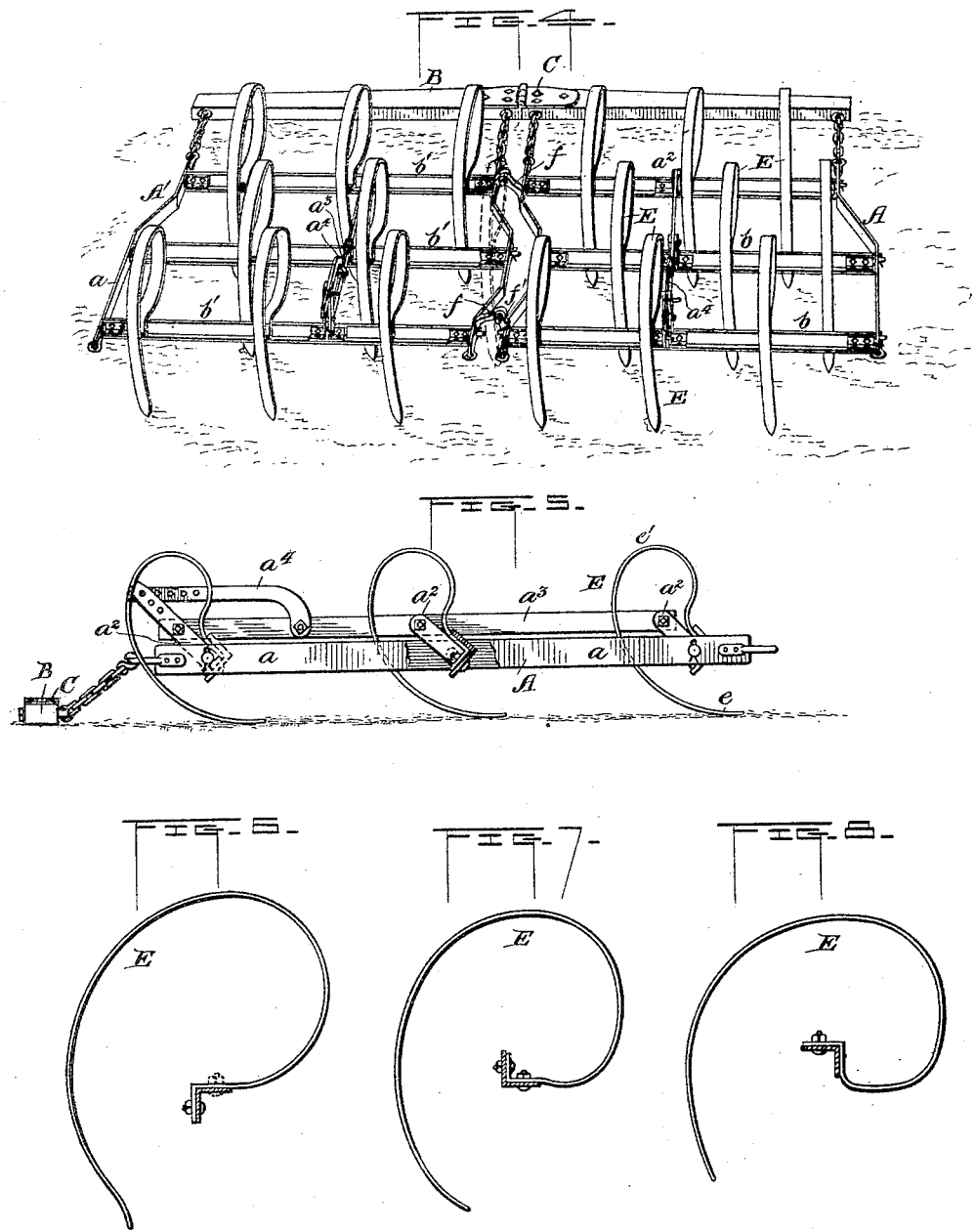

UNITED STATES PATENT OFFICE.

PAUL BLAKER, OF NEWTOWN, OHIO.

HARROW OR CULTIVATOR.

SPECIFICATION forming part of Letters Patent No. 454,324, dated June 16, 1891.

Application filed December 2, 1890. Serial No. 373,357. (No model.)

*To all whom it may concern:*

Be it known that I, PAUL BLAKER, a citizen of the United States, residing at Newtown, in the county of Bucks and State of Ohio, have invented certain new and useful Improvements in Harrows or Cultivators; and I do hereby declare the following to be a full, clear, and exact description of the invention, such as will enable others skilled in the art to which it appertains to make and use the same.

My present invention relates to improvements in harrows or cultivators.

The principal object of the invention is to provide a simple, inexpensive, durable, and efficient harrow, possessing all the advantages of a complete and perfect implement without the disadvantages incident to implements of this character heretofore in use.

To this end my invention consists, principally, in a harrow or cultivator of improved construction, which shall consist of as few parts as possible, comprising a complete, compact, and perfect working implement in which many of the auxiliary devices and attachments heretofore in use are dispensed with and the construction simplified, so as to cheapen the manufacture and lessen the cost of subsequent renewal of parts.

The invention also consists in an improved harrow-tooth of peculiar construction, which shall be effective in use and less liable to clog the harrow than similar devices heretofore in use; in improved means for securing the teeth to the harrow-frame, and in other features of construction, all as hereinafter described, and particularly pointed out in the claims at the end of this specification.

These several objects are attained by the mechanism hereinafter described and illustrated in the accompanying drawings, in which—

Figure 1 is a perspective view of a sectional harrow embodying my invention. Fig. 2 is a side elevation thereof, partly in section. Fig. 3 is a perspective view of one of the teeth detached, showing in dotted lines a portion of one of the angle-bars detached. Fig. 4 is a rear perspective view showing the hinges uniting the harrow-sections in reversed position, adapting one section of the harrow to be laid over on the top of the adjoining section instead of being folded under the other, as provided in Fig. 1. Fig. 5 is a side elevation showing the draft-bar applied to the rear of the harrow and the teeth in position to serve as runners in transporting the harrow from place to place. Figs. 6, 7, and 8 are detached views illustrating different methods of attaching the teeth to the angle-bars.

Similar letters of reference are used to designate similar parts in each of the several figures of the drawings.

The harrow may be composed of two or more sections, as A A', Fig. 1, hinged together centrally by means of any of the ordinary flexible link connections, but preferably as hereinafter described. Each section is composed of side bars $a$ $a'$, which have their front ends extended to form or receive clevises or hooks for the attachment of the draft-bar, and the connections in the present instance are shown as consisting of the ordinary links or sections of chains.

$b$ $b'$ represent angle-bars, which may be journaled in the side bars $a$ $a'$ in any suitable manner—as, for instance, by means of angle-irons $b^2$, Fig. 3, which have studs thereon adapted to enter perforations in the side bars of the frame and be secured thereto by means of pins or nuts in the usual way. These angle-bars $b$ $b'$ form the pivoted tooth-bars of the frame and have each projecting upwardly therefrom a lug $a^2$, which lugs are pivoted to a common connecting-rod $a^3$. The lug upon one of the angle-bars, preferably the rear bar, is extended upward a suitable distance above the pivotal connection with the connecting-rod and has a series of perforations therein, as shown in Fig. 2. A lever $a^4$ has its front end pivoted to the connecting-rod $a^3$, and is provided with a series of perforations at its rear end, through any one of which and through any one of the series of perforations in the rear lug $a^2$ a pin or bolt may be passed so as to secure the tooth-bars in any desired position of adjustment, these devices being adapted to rock the tooth-bars upon their pivots, so as to adjust the teeth to different angles, and thereby vary the depth of penetration.

The draft-bar B is connected centrally of the harrow at or about in a line with the pivotal connections between the harrow-sections by a rule-joint, as at $c$, which permits the outer ends of the draft-bar to rise and fall independently, but prevents independent vertical movement at the center of the bar, and consequently prevents independent vertical movement of the inner portions of the harrow-sections when flexibly connected together, which arrangement will prevent the central portion of the harrow from rising independently and thus failing to properly do its work, as the weight of the harrow will oppose any upward vertical movement at the center, thereby causing the same to thoroughly cultivate the ground the entire sweep or width of the harrow. The draft-bar B is also provided with the usual draft-connections $c'$ $c'$, extending from the central portion of the beam-sections to the draft-ring $c^2$, to which the singletree or doubletree is to be attached.

The inner side bar $a$ of the harrow-section A is bent outwardly near each end at an obtuse angle to the main portion, thence parallel to the central portion, so as to form a central depression in the harrow-frame, and the corresponding inner bar $a'$ of the adjoining section A' is similarly bent so as to form a bulged central portion which when the sections are coupled together is arranged substantially in line with the end portions of the bar $a$ of the adjacent section, so that the inner tooth upon the center bar of the section A' will be placed substantially in a line with the hinges which connect the two sections together, so that every portion of the ground traversed by the harrow will be thoroughly cultivated and harrowed, the remaining teeth in the frame being arranged upon the bars to accomplish this purpose in the manner indicated in Fig. 1.

The teeth E are each preferably composed of a single piece of spring metal, which is curved in oval form the greater portion of the length of the tooth from the point $e$ thereof, Fig. 3, toward the head until the said curve reaches the return-point $e'$ of the ellipse, at which point the oval curve merges into an ogee curve, which forms the neck in the head $e^2$ of the tooth and terminates in an angular bent end $e^3$, which is adapted to fit the angle-iron of the tooth-beam and be secured thereto by a single bolt, which passes through the end portion $e^3$ of the head and through the horizontal portion of the angular beam, while the adjoining portion $e^4$ of the next and head of the tooth rests against the upright portion of said angular bar. By this construction the bolt which secures the beam in place will be relieved of strain by reason of the bearing of the part $e^4$ upon the upright portion of the angle-bar, and side motion of the tooth is thereby prevented.

Figs. 6, 7, and 8 illustrate modifications in which the teeth are secured to the angle-bars in a manner similar to that indicated in Fig. 3, but with the teeth and bars arranged in different positions, as shown, and secured in place by means of one or more fastening-bolts. In the last-mentioned figures the tooth-head is also of a slightly-different construction from the preferred form illustrated in Fig. 3, but all the advantages of supporting the tooth so as to relieve he fastening-bolt of strain and prevent side motion of the tooth are preserved.

The harrow-tooth of the peculiar construction illustrated herein renders the harrow less liable to clog than when spring-teeth of the construction now commonly in use are employed, for the reason that by extending the oval curve beyond a vertical line passing through the tooth-fastening at right angles to the harrow-frame in the manner indicated, grass, weeds, and other clogging matter will be unobstructed by contact with the frame or with the head of the tooth, or the devices by which it is fastened to the tooth-bars. Furthermore, by the construction shown I am enabled to rock the angle-bars to a sufficient extent to adapt the same to act as crushers for the purpose of pulverizing clods, &c., without injuring the teeth by wear upon the main portions thereof.

The hinges by which the two sections of the harrow are coupled together are each composed of two parts $f$ $f'$, the part $f$ being longer than the part $f'$, and these hinges are arranged so that one short section and one long section are attached to each of the inner side bars $a$ $a'$, the short section at the front of the harrow being pivoted to the longer section on the adjoining frame-bar, and the long section at the rear of the harrow being pivoted to the short section on the same bar, so that the harrow may be folded without cramping or binding the hinges. This construction also permits the tooth-bars and side bars of the frame when folded to lie parallel one upon the top of the other in the same vertical plane.

In Fig. 1 the harrow-sections are hinged together with the reversible hinges depending therefrom, while in Fig. 4 the position of the hinges is reversed, so that in the former case the harrow-sections are adapted to be folded one under the other, while in the latter case said sections are adapted to be folded one upon the other, in which position in either case the harrow is adapted to be drawn from the field by reversing the draft-connections and adjusting the teeth as indicated in Fig. 5, so that the points thereof will rest upon the ground after the manner of runners, so as to permit the harrow to be transported from place to place.

By the described arrangement of converting the teeth into runners all the wear incident to such use will be upon the points of the teeth instead of the main portions thereof, which latter construction results in injury to the tooth by wearing the same away, so as to cause breakage.

I am aware that harrows have heretofore been provided with draft-beams composed of sections hinged together at or about in a line with the hinges connecting the harrow-sections; and I am also aware that curved spring harrow-teeth of several varieties of construction have been heretofore devised. I am also aware that it is not broadly new to adapt the harrow-teeth to serve as runners in transporting the harrow, and I do not claim any of these features, broadly; but, Without limiting my invention to the exact details of construction, which may be varied in a number of ways without departing from the spirit of my invention, I claim as new, and desire to secure by Letters Patent, as follows:

1. A spring-tooth for harrows or cultivators, consisting of a single piece of spring metal curved in oval form the greater portion of its length from the point toward the main portion or head of the tooth, said main curved portion merging into an ogee curve, which forms the neck and head of the tooth, the latter terminating in an angular bent portion adapted to fit the angle-iron tooth-beam, substantially as described.

2. In combination with the harrow or cultivator frame having tooth-beams composed of angle-iron, the spring harrow-tooth curved in oval form from the point thereof the greater portion of its length, said main curved portion merging into a neck and head, which latter terminates in an angular bent portion adapted to fit the angle-iron tooth-beam, the angular portion of the head of said tooth being seated flush against the angle-iron tooth-beam and secured thereto by a bolt passing through the angle-iron and the bent end of said tooth, substantially as described.

3. A sectional pivoted tooth-harrow comprising a centrally-hinged frame having the side bars, of the sections extended to receive the draft attachments, a jointed draft-bar flexibly connected to the extended portions of said side bars, angle-bars journaled in the side bars of said sections, teeth having angular heads bolted to said angular bars, lugs on said angle-bars pivoted to a common connecting-rod, and a lever pivoted at one end of said connecting-rod and having its opposite end perforated and adjustably connected to a perforated lug mounted on one of the tooth-bars, substantially as described.

4. In a harrow or cultivator, the combination of the frame composed of two or more sections, each section having its inner side bar bent near each end at an obtuse angle to the main portion, thence outwardly parallel to said central portion, so as to form a central bulge upon one section of the harrow and a corresponding depression in the adjoining section to receive said bulged portion when the parts are coupled together, whereby the main portion of the bar having the bulged center will be arranged substantially in line with the draft end of the inner side bar of the adjacent section, substantially as described.

5. The combination, in a harrow or cultivator composed of two or more sections, of the reversible hinges coupling the sections together, said hinges being each composed of a long and short section pivotally connected together, so as to form an eccentric connection between the harrow sections, whereby one section may be folded over or under the other with the frame-bars of both sections arranged parallel to each other, substantially as described.

6. The combination of the frame, the rotatable tooth-bars secured to said frame, curved teeth attached to said bars, reversible draft-connections, and mechanism for rotating the tooth-bars, whereby the teeth are adapted to be set so as to act as runners when the draft is applied at the rear of the harrow, substantially as described.

In testimony whereof I affix my signature in presence of two witnesses.

PAUL BLAKER.

Witnesses:
T. H. BROWN,
THEO. A. HARDING.